United States Patent
Ali et al.

(10) Patent No.: US 8,564,298 B2
(45) Date of Patent: Oct. 22, 2013

(54) NON-INTRUSIVE ENERGY HARVESTING SYSTEMS AND METHODS

(75) Inventors: Mohammod Ali, Irmo, SC (US); Rashed H. Bhulyan, West Columbia, SC (US); Roger Dougal, Columbia, SC (US)

(73) Assignee: University of South Carolina, Columbia, SC (US)

( * ) Notice: Subject to any disclaimer, the term of this patent is extended or adjusted under 35 U.S.C. 154(b) by 755 days.

(21) Appl. No.: 12/631,175

(22) Filed: Dec. 4, 2009

(65) Prior Publication Data
US 2012/0013292 A1    Jan. 19, 2012

(51) Int. Cl.
*G01N 27/416* (2006.01)
*H02J 7/00* (2006.01)

(52) U.S. Cl.
USPC ........... 324/426; 324/427; 324/428; 324/429; 320/132; 320/134; 320/136; 320/152; 320/157

(58) Field of Classification Search
CPC .................................................. G01R 31/3648
USPC .......................................................... 324/426
See application file for complete search history.

(56) References Cited

U.S. PATENT DOCUMENTS

| | | | |
|---|---|---|---|
| 6,535,135 B1* | 3/2003 | French et al. | 340/682 |
| 2006/0076838 A1* | 4/2006 | Solveson et al. | 307/651 |

* cited by examiner

*Primary Examiner* — Edward Tso
*Assistant Examiner* — Ahmed Omar
(74) *Attorney, Agent, or Firm* — Dority & Manning, P.A.

(57) ABSTRACT

In accordance with certain embodiments of the present disclosure, an energy harvesting system is provided. The system comprises a coil wound about a generally cylindrical shaped magnetic core having a first end and a second end. The coil includes wires that are wound in such a manner that the wires are generally parallel to the cylindrical shaped magnetic core axis. The cylindrical shaped magnetic core defines a core gap that extends parallel to the magnetic core axis. The cylindrical shaped magnetic core also defines an opening extending therethrough from the first end to the second end such that the cylindrical shaped magnetic core is configured to fit around current carrying conductor.

21 Claims, 11 Drawing Sheets

$m_1$= actual core gap width, $m_2$= increased core gap width due to fringing flux (b)

FIG. 17

| Core gap, $l_g$ mm | Energy coupler output rms ac voltage (V) | | Error (%) |
|---|---|---|---|
| | Theoretical (Model (11)) | Measured | |
| 1 | 0.825 | 0.760 | 7.9 |
| 2 | 0.633 | 0.577 | 8.9 |
| 3 | 0.539 | 0.485 | 10.0 |
| 4 | 0.476 | 0.420 | 11.9 |
| 5 | 0.430 | 0.373 | 13.3 |
| 6 | 0.393 | 0.330 | 16.1 |

FIG. 18

| Wire diameter, AWG (mm) | Calculated source resistance, $R_S$ (Ω) | Calculated inductance $L_S$ (μH) | Optimized value from simulation | |
|---|---|---|---|---|
| | | | Load resistance, $R_L$ (Ω) | output power, mW |
| Ideal case | 0 (ideal) | 0 (ideal) | 58.01 | 17.86 |
| 27 (0.361) | 4.86 | 327 | 73.39 | 14.36 |
| 30 (0.255) | 9.74 | 327 | 76.09 | 10.38 |
| 33 (0.18) | 19.54 | 327 | 118.23 | 6.21 |
| 36 (0.127) | 39.25 | 327 | 233.89 | 3.3 |

FIG. 19

| Load resistance $R_L$ (Ω) | Simulated results | | Measured results | |
|---|---|---|---|---|
| | Load voltage (V) | Load Current (mA) | Load voltage (V) | Load Current (mA) |
| 0.49 | 0.0109 | 22.25 | 0.009 | 23.19 |
| 1.00 | 0.0222 | 22.1 | 0.02 | 22.14 |
| 5.01 | 0.106 | 21.1 | 0.105 | 21.4 |
| 9.99 | 0.199 | 19.9 | 0.199 | 19.99 |
| 25.09 | 0.427 | 17.03 | 0.432 | 17.06 |
| 50 | 0.695 | 13.87 | 0.71 | 14.03 |
| 75 | 0.879 | 11.72 | 0.861 | 11.98 |
| 196.1 | 1.335 | 6.81 | 1.29 | 6.84 |
| 299.6 | 1.513 | 5.05 | 1.51 | 4.9 |

FIG. 20

| $n$ | $w$ (cm) | $l_g$ (mm) | $D_0$ (mm) | $D_i$ (mm) | $l_m$ (mm) |
|---|---|---|---|---|---|
| 8 | 5 | 1 | 16.3 | 14.32 | 47.03 |
| 5 | 5 | 1 | 16.1 | 14.5 | 47.02 |
| | | 2 | 15.95 | 14.37 | 45.58 |
| | | 3 | 15.99 | 14.45 | 44.77 |
| | | 4 | 16.19 | 14.61 | 44.34 |
| | | 5 | 15.97 | 14.42 | 42.7 |
| | | 6 | 15.88 | 14.3 | 41.36 |
| 5 | 9 | 1 | 15.97 | 14.41 | 46.68 |
| | | 2 | 16.2 | 14.53 | 46.22 |
| | | 3 | 16.12 | 14.49 | 45.04 |
| | | 4 | 15.95 | 14.34 | 43.53 |
| | | 5 | 16.16 | 14.55 | 43.2 |
| | | 6 | 15.91 | 14.31 | 41.43 |
| 3 | 5 | 1 | 15.15 | 14.45 | 45.5 |
| 1 | 5 | 1 | 14.51 | 14.33 | 44.30 |

NON-INTRUSIVE ENERGY HARVESTING SYSTEMS AND METHODS

GOVERNMENT SUPPORT CLAUSE

The present invention was developed with funding from the Office of Naval Research under award N00014-08-0080. Therefore, the government retains certain rights in this invention.

CROSS REFERENCE TO RELATED APPLICATION

The present application claims is based on and claims priority to U.S. Provisional Application Ser. No. 61/200,874, filed Dec. 4, 2008, which is incorporated by reference herein in its entirety.

BACKGROUND

Monitoring line conditions, disturbances, and faults is essential to ensure proper operation of a power system. Autonomous wireless sensors are key elements which can enable such monitoring in a simple, easy and cost effective manner. Such sensors can probe the necessary currents, voltages, and insulation properties of a power line in a non-intrusive manner and then relay such data to a decision station wirelessly. Sensors exist which require power of 10 mW. Low power wireless sensors can rely on high capacity batteries to operate for years. However, to keep the sensor size and cost to a minimum, the energy needs of sensors can be met by miniature cheap batteries (e.g. coin cell batteries). Since smaller batteries have limited capacity they must be recharged from time to time.

A good option for solving the energy needs associated with wireless sensors is to scavenge energy from the ambient environment. This may include scavenging energy using solar, vibrational, thermal, acoustic and electromagnetic mechanisms. A variety of mechanisms have been utilized in this regard, including photovoltaic technology specifically applicable to indoor lighting environments, moving magnets through a coil and a spring for a resonant structure so vibrational energy could be converted, scavenging power from human movement, thermoelectric devices that can produce power from a temperature differential, and electromagnetic generators.

Wireless power transfer by EM induction has been investigated by many researchers for various applications. The principle of inductive coupling for wireless power transmission has been utilized but the mechanisms to date are either unsuitable for real world implementation or cannot provide enough power. A comparable (but not identical) structure is a Rogowski coil. However, if a small Rogowski coil is used, it will harvest very low power because of its material construction which contains an air core. The induced voltage is so low that an active integrating device will be needed to enhance that voltage. The active integrating device itself will consume energy. On the other hand, a large size Rogowski coil will not be convenient for certain applications, such as most miniature sensor devices. If they are used with a large number of wireless distributed sensors on an overhead power line their weight can easily create additional undesired sag.

Thus, improvements in mechanisms for scavenging energy are still needed.

SUMMARY

Objects and advantages of the invention will be set forth in part in the following description, or may be obvious from the description, or may be learned through the practice of the invention.

In accordance with certain embodiments of the present disclosure, an energy harvesting system is provided. The system comprises a coil wound about a generally cylindrical shaped magnetic core having a first end and a second end. The coil includes wires that are wound in such a manner that the wires are generally parallel to the cylindrical shaped magnetic core axis. The cylindrical shaped magnetic core defines a core gap that extends parallel to the magnetic core axis. The cylindrical shaped magnetic core also defines an opening extending therethrough from the first end to the second end such that the cylindrical shaped magnetic core is configured to fit around current carrying conductor.

In certain aspects of the present disclosure, an energy harvesting system is provided. The system includes a coil wound about a generally cylindrical shaped magnetic core having a first end and a second end and an integrated voltage multiplier. The coil includes wires that are wound in such a manner that the wires are generally parallel to the cylindrical shaped magnetic core axis. The cylindrical shaped magnetic core comprises a high permeability mu-metal defining a core gap that extends parallel to the magnetic core axis. The cylindrical shaped magnetic core also defines an opening extending therethrough from the first end to the second end such that the cylindrical shaped magnetic core is configured to fit around current carrying conductor.

In still other embodiments of the present disclosure, a method for scavenging energy is provided. The method includes placing an energy scavenging device around a current carrying conductor and charging a battery joined to the energy scavenging device.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which:

FIG. 17 illustrates a comparison between theoretical and experimental results. Parameters: n=5, w=50 mm, d=0.1016 mm, N=280, T=0.78 mm, I=13.5 A, f=60 Hz, $N_p$=5, $\mu_r$=$10^5$ (for other parameters see Table 4).

FIG. 18 illustrates a simulated optimized DC output performance of the energy coupler for different diameters of the coil wire.

FIG. 19 illustrates a comparison of simulated and measured dc output voltage and current.

FIG. 20 illustrates values of the parameters $D_0$, $D_i$ and $l_m$ with respect to number of layers (n) in the core, core width (w) and core gap ($l_g$).

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

Generally, the present disclosure is directed to an energy harvesting system that exploits the well known principle of electromagnetic (EM) induction. The present disclosure describes an energy coupler from which energy can be harvested from a current carrying conductor in a power system. Generally, the energy coupler is constructed by winding hundreds of turns of very thin conducting wires around a core made by shaping layers of flexible high permeability magnetic materials (mu-metals, i.e., a soft ferromagnetic material) in cylindrical form. An intentional gap in the flexible core allows the energy coupler to be formed in an agreeable shape to enclose a power line conductor ensuring maximum magnetic flux coupling. The proposed energy coupler is miniature, low cost, and can be easily integrated with a wireless sensor.

In addition to the design, fabrication, and characterization of the energy coupler, the present disclosure describes a theoretical model to understand the flux linkage aspects to the coupler from the primary conductor. Using the theoretical model the induced ac voltage in the energy coupler can be calculated for cores constructed from multi-layer high permeability magnetic materials with small core gaps. The present disclosure present a new modified model to analyze the performance of coils on solid magnetic cores with core gaps that considers the fringing flux across the core gap and the interlayer air gaps present in a core consisting of multiple layers of very thin magnetic materials.

Figure 1:
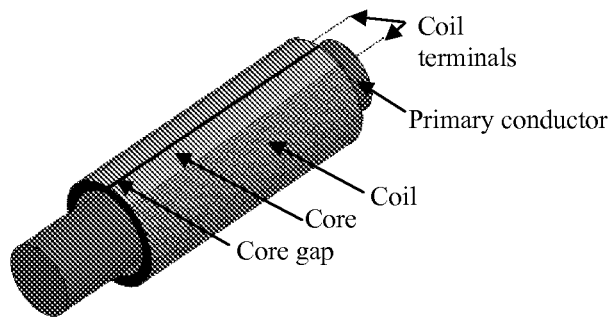
FIG. 1 illustrates a multi-turn coil on a magnetic core around a current carrying conductor.

The energy coupler of the present disclosure comprises a multi-turn coil wound against a magnetic core material constructed from several layers of high permeability mu-metal and an integrated voltage multiplier. The construction of the coil on the magnetic core is illustrated in FIG. 1. Flexible foils of mu-metal are stacked up to form a laminated core. The typical foil thickness is about 4 mils (0.1016 mm) and the permeability of the mu-metal is $10^5$. The core is shaped as a cylinder in such a way that there is a very small core gap. A very thin wire (diameter=0.255 mm) is wound around the core such that the wires are parallel to the cylinder axis. The power line conductor or the structure containing a conductor bundle goes through the energy coupler aperture as shown in FIG. 1. The capability of wrapping around the current carrying conductor is of great importance. If the core is a solid structure, it will have to be put on the cable during the cable manufacturing process. Alternatively, the cable has to be disconnected from the power source which is undesirable because it will disrupt continuous power supply. The presence of the core gap eliminates these two problems and allows greater flexibility in placing the sensor anywhere along the cable. The energy coupler scavenges ac power from the power cable electromagnetically. The ac voltage induced in the coil can be measured across the coil terminals. The output ac voltage of the energy coupler is converted to dc using a voltage multiplier. The dc output of the voltage multiplier can charge a rechargeable battery.

Figure 2:
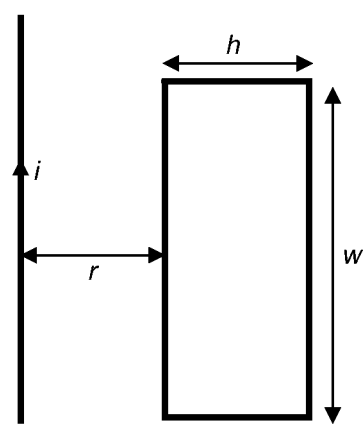
FIG. 2 illustrates a rectangular coil near a current carrying conductor.

The induced ac voltage in the coil is an important quantity because the dc power available at the multiplier output is dependent on this voltage. As further described herein, an analytic model can be used to calculate the induced ac voltage in the coil. A simple expression for the induced voltage in a single turn coil can be developed considering the factors affecting it in order to approach the real situation. Consider the rectangular coil made of metal wire in free-space as shown in FIG. 2. A conductor carrying an alternating current i is placed at a distance r from one side of the coil. If the coil is wound around a magnetic material with width, height and relative permeability of w, h and $\mu_r$ respectively, then the magnetic flux linking the coil is, $$\phi = \frac{\mu_0}{2\pi}\mu_r w i \ln\left(1 + \frac{h}{r}\right). \quad (1)$$

where $\mu_0$=$4\pi \times 10^{-7}$ (H/m) is the permeability of free-space. Thus if an N turn coil is wound around the core encircling the current carrying conductor as seen in FIG. 1 then the voltage induced in the coil terminals is given by, $$v = -N\frac{d\phi}{dt} \quad (2)$$

Figure 3:
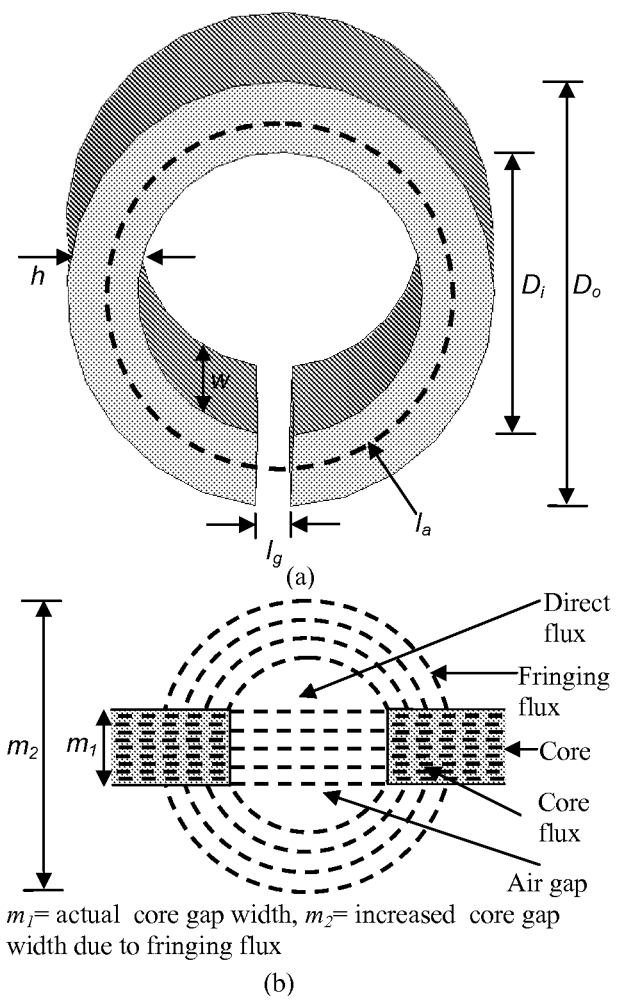
FIG. 3 illustrates (a) a magnetic core with core gap, (b) fringing flux across the core gap.

Using (1) and (2) the root mean square (rms) value of the induced voltage is found as $$V = N\mu_0\mu_r wfl\ln\left(1 + \frac{h}{r}\right) \quad (3)$$

where f and I are the frequency and rms magnitude of the current respectively. The limitation of (3) is that it ignores the effect of the gap that exists in the core. The energy coupler described herein has a magnetic core with core gap. Core gaps have very high reluctances compared to the mu-metal and hence reduce the flux linking the core. This represents a significant change in effective permeability (of the core with gap). FIG. 3(a) shows the magnetic core with a core gap where the core gap length is $l_g$. The most common and simplified model incorporates the effect of core gaps and approximates the relative permeability as $$\mu_{rg} = \frac{\mu_r}{1 + \left(\frac{l_g}{l_m}\right)\mu_r} \quad (4)$$

where $\mu_{rg}$ is the effective permeability of the medium considering the core gap, $l_g$ is the length of the core gap and $l_m$ is the mean length of the magnetic path in the core. The parameter $l_m$ is found as $(l_a-l_g)$, where $l_a$ is the mean length of the magnetic field lines along the core including the core gap. If $D_o$ and $D_i$ are the outer and inner diameters of the core and $D_o/D_i$ is greater than 1.1, then a more accurate value for $l_a$ can be calculated as, $$l_a = \frac{\pi(D_0 - D_i)}{\ln\left(\frac{D_0}{D_i}\right)}. \quad (5)$$

As further described herein, the model in (4) underestimates the value of the effective permeability. This is because it does not incorporate the effect of the fringing flux across the air gap as shown in FIG. 3(b). The fringing flux increases the effective width of the core gap from $m_1(=w)$ to $m_2$. This effect decreases the reluctance of the core gap and since permeability is inversely related to reluctance hence the effective permeability decrease will not be as pessimistic as in (4). When considering the effect of the fringing flux, then the effective permeability can be approximated as, $$\mu_{rg} = \frac{C}{\frac{1}{\frac{A}{l_g} + \left(0.241 + \frac{1}{\pi}\ln\frac{b}{l_g}\right)P} + \frac{C}{\mu_r}} \quad (6)$$

where $C=l_m/A$, A is the cross sectional area of the core, i.e. A=h,w (FIG. 3a), P is the perimeter of the cross section of the core, i.e., P=2(h+w), b is half the inside perimeter of the toroidal core i.e. b=$\pi D_i/2$ [33]. It is believed that the accuracy of the model described by (6) for pot core structures is within 2% provided $l_g$ is shorter than the w and b/$l_g$ is larger than about 5.

The difference between (4) and (6) can be understood if (6) is rewritten in a similar form as (4), $$\mu_{rg} = \frac{\mu_r}{1 + \left(\frac{l_g}{l_m}\right)\mu_r\left[\frac{1}{1 + \frac{l_g}{A}\left(0.241 + \frac{1}{\pi}\ln\frac{b}{l_g}\right)P}\right]} \quad (7)$$

The term in the square bracket in the denominator of (7) is always less than 1, so $\mu_{rg}$ in (7) is always larger than $\mu_{rg}$ in (4).

Figure 4:
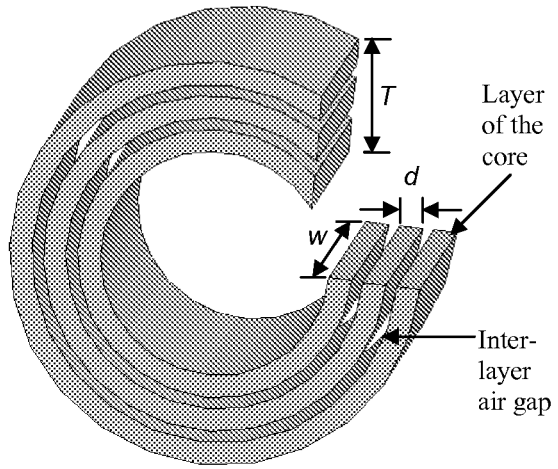
FIG. 4 illustrates a multilayer core structure.
Figure 5:
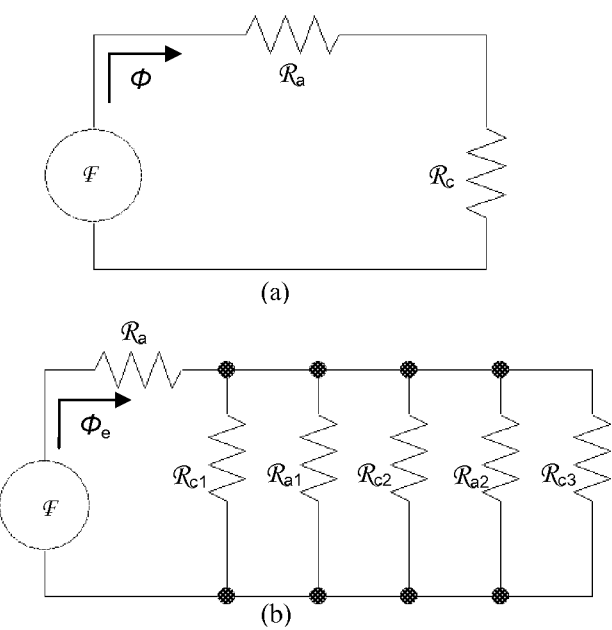
FIG. 5 illustrates a circuital representation of (a) a single layer core and (b) a multi-layer core.

Since in the present disclosure, thin layers of the magnetic material are stacked up in order to achieve a flexible core structure there will be interlayer air gaps as shown in FIG. 4 which will reduce the effective permeability of the core. The effects of the interlayer air gaps can be better understood using a circuital approach. FIGS. 5(a) and 5(b) show that approach for the core configurations in FIGS. 3(a) and 4. In FIG. 5, F is the magnetomotive force (mmf) which is causing the flux ($\Phi$) to flow through the core. $R_a$ and $R_c$ in FIG. 5(a) are the reluctances due to the core gap and magnetic core respectively. It is to be noted that $$R = \frac{l}{\mu A} \quad (8)$$

where l is the length and A is the cross sectional area of the magnetic path. Now when a multilayer core is used as in FIG. 4, the core layers and the interlayer air gaps each offers different reluctances and the combination acts like a circuit having parallel reluctances as in FIG. 5(b). Since for each core layer A=w.d with d<h; each layer gives higher reluctance than the reluctance $R_c$ given by a single core structure. For the interlayer air gap, the permeability is very low and hence the reluctances $R_{a1}$ and $R_{a2}$ are very high. Therefore the equivalent reluctance in FIG. 5(b) will be higher than that in FIG. 5(a). Hence the multilayer core has lower effective permeability than the single layer core.

To incorporate the effect of a layered core material with air gaps in between the layers (6) must be modified. If there are n mu-metal layers in the core, then there are (n−1) interlayer gaps. If $R_a$ and $R_{rg}$ are the reluctances of the interlayer air gap and mu-metal layer with core gap, respectively, then the equivalent reluctance $R_{rgn}$ of the layered core is found from, $$\frac{1}{\mathcal{R}_{rgn}} = (n-1)\frac{1}{\mathcal{R}_a} + n\frac{1}{\mathcal{R}_{rg}} \quad (9)$$

Using (8) in (9), $$\frac{\mu_0\mu_{rgn}A_{rgn}}{l} = (n-1)\frac{\mu_0\mu_a A_a}{l} + n\frac{\mu_0\mu_{rg}A_m}{l} \quad (10)$$

where $\mu_a$ and $\mu_{rg}$ are the relative permeabilities of the interlayer air gaps and the mu-metal with core gap, respectively; $\mu_{rgn}$ is the effective permeability of the core and, $A_{rgn}$, $A_a$, and $A_m$ are the cross sectional areas of the core, the interlayer air gap and the mu-metal layer, respectively and l is the length of the magnetic path. If T, t and d are the thicknesses of the core, the interlayer air gap and the mu-metal layer, respectively then $A_{rgn}=wT$, $A_a=wt$, and $A_m=wd$. Also $T=[nd+(n-1)\,t]$. Simplifying (10), $$\mu_{rgn} = 1 + (\mu_{rg} - 1)\frac{nd}{T}. \tag{11}$$

The output voltage of the energy coupler can be calculated from (3) by replacing $\mu_r$ with $\mu_{rgn}$ obtained from (11) which uses the $\mu_{rg}$ in (6).

The following examples are meant to illustrate the disclosure described herein and are not intended to limit the scope of this disclosure.

EXAMPLES

Measurements on the proposed energy coupler were done in two stages. First, the induced ac voltage was measured across the coil terminals with no load connected to it. Second, experiments were performed to evaluate the dc performance of the energy coupler. On the theoretical side the induced voltage was calculated using three models which are defined below:

Model (4): induced voltage obtained from (3) where $\mu_r$ is replaced by $\mu_{rg}$ given in (4).

Model (6): induced voltage obtained from (3) where $\mu_r$ is replaced by $\mu_{rg}$ given in (6).

Model (11): induced voltage obtained from (3) where $\mu_r$ is replaced by $\mu_{rgn}$ given in (11).

In all theoretical analyses $\mu_r=10^5$ was used and mu-metal thickness $h=n.d$ and distance $r=D_i/2$. The values of the parameters $D_0$, $D_i$ and $l_m$ used in Models (4), (6) and (11) are listed in Table 4.

A. Induced AC Voltage Performance

Figure 6:
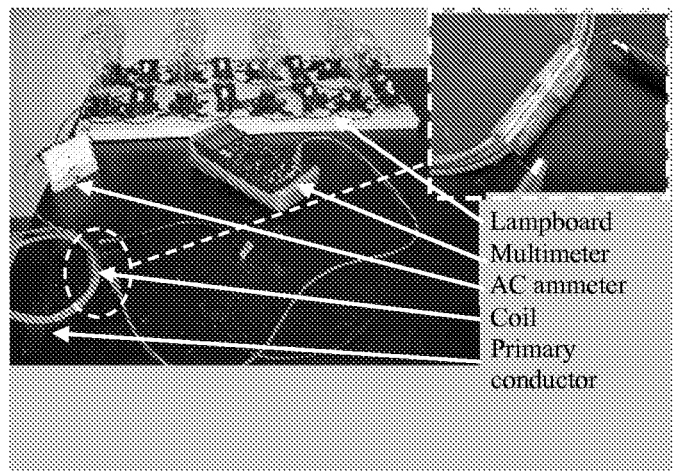
FIG. 6 illustrates an experimental setup for output ac voltage measurement (inset shows the coil of the energy coupler).

A prototype energy coupler was fabricated with N=280 turns and n=5 layers of mu-metal. The width (w), length and thickness (d) of each mu-metal layer was 50 mm, 45 mm, and 4 mils (0.1016 mm), respectively. The thickness (T) of the core including the interlayer air gaps was 0.78 mm. FIG. 6 shows the experimental setup that was used to measure the induced ac voltage across the coil terminals. A lamp board comprising eight parallel 200 W light bulbs draws current from a 120V, 60 Hz supply main. Each light bulb can be individually turned on or off and hence the current through the primary conductor can be varied. Total 5 turns ($N_p$) of an insulated primary current carrying conductor were passed through the coil aperture and the maximum current flow through the primary conductor measured using an ac ammeter was I=13.5 A. Multiple turns of the primary conductor were passed through the energy coupler aperture in order to create a large primary magnetic flux. A better view of this is given in FIG. 6. The coil terminals were directly connected to a digital multimeter to measure the no load ac voltage.

Harvested ac output voltages across the coil terminals were measured by varying a number of parameters, such as, the core gap ($l_g$), the number of core layers (n), the core width (w), the number of turns (N), and the current (I) in the primary conductor(s) etc. Since $l_g$ is an important parameter, measurement results were first compared with the results obtained using the theoretical Model (11). In the theoretical analysis, the same above parameters were used for the energy coupler along with $\mu_r=10^5$.

Table 1 shows the comparison between the measured and theoretical rms ac voltages across the coil terminals as function of $l_g$. Since it was difficult to create $l_g<1$ mm the smallest value for which experiments were performed was $l_g=1$ mm.

As apparent, increasing $l_g$ decreases the output voltage. This is expected since larger $l_g$ means higher reluctance and lower effective permeability, $\mu_{rgn}$. For 6 different $l_g$ values, the theoretical data closely follow the measured data. As $l_g$ varies from 1 to 3 mm the percentage error (defined as the percent difference between the measured and the theoretical data) is less than 10%. For $l_g>3$ mm, the percentage error increases. This may be due to the fact that $l_g$ becomes comparable to the width of the air gap (w) and $b/l_g$ is less than 5.

Figure 7:
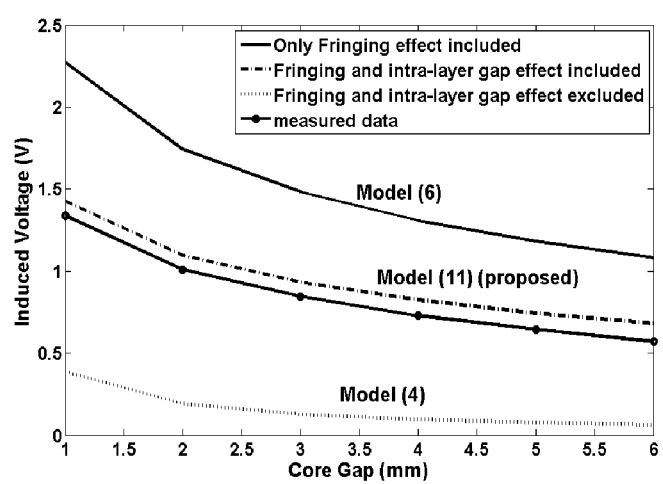
FIG. 7 illustrates theoretical and measured voltages vs. core gap ($l_g$). Parameters: n=5, w=90 mm, d=0.1016 mm, N=280, T=0.78 mm, I=13.5 A, f=60 Hz, $N_p$=5, $\mu_r$=$10^5$.

To further verify the results, another coil was constructed but the core width (w) was changed to 90 mm and the output rms ac voltages were measured as function of $l_g$. These results are shown in FIG. 7. The theoretical voltages obtained using Models (4) and (6) are also shown for comparison. As seen Models (4) and (6) cannot approximate the measured results closely. Only Model (11) approximates the results within 10% error for $l_g<4$ mm.

Figure 8:
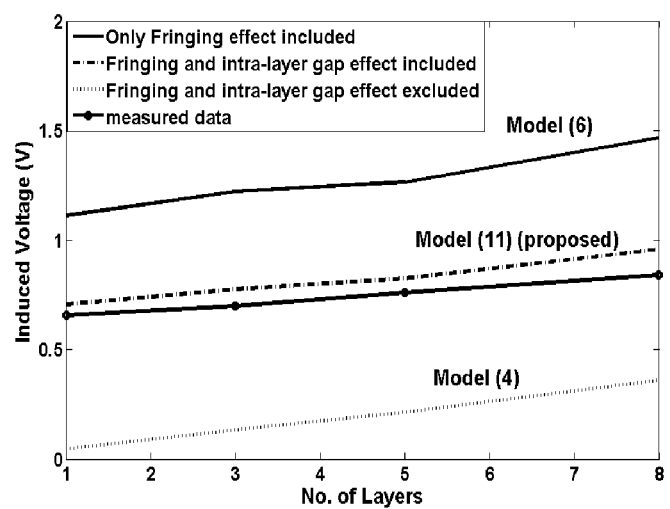
FIG. 8 illustrates theoretical and measured voltages vs. the number of core layers (n). Parameters: $l_g$=1 mm, w=50 mm, d=0.1016 mm, N=280, I=13.5 A, f=60 Hz, $N_p$=5, $\mu_r$=$10^5$.

Since the output ac voltage is dependent on T which in turn relies on n, therefore output ac voltages were measured for 1, 3, 5 and 8 layers (n) of the core material. The corresponding measured T values were 0.16 mm, 0.481 mm, 0.78 mm and 1.25 mm respectively. The theoretical and measured results are shown in FIG. 8. According to (3), the output ac voltage is expected to increase with the increase in the number of core layers (n). Such results are in FIG. 8. One important observation here is that the slope of the curves for Model (4) and Model (6) are steeper than those for Model (11) and the experimental results. This is because Models (4) and (6) disregard the interlayer air gaps and hence the effective permeabilities calculated in these models are higher than the effective permeability used in Model (11). With the increase in the number of layers, the number of interlayer air gaps increases which causes the effective permeability to decrease and hence results in a smaller slope in Model (11) and in the experimental curve.

Figure 9:
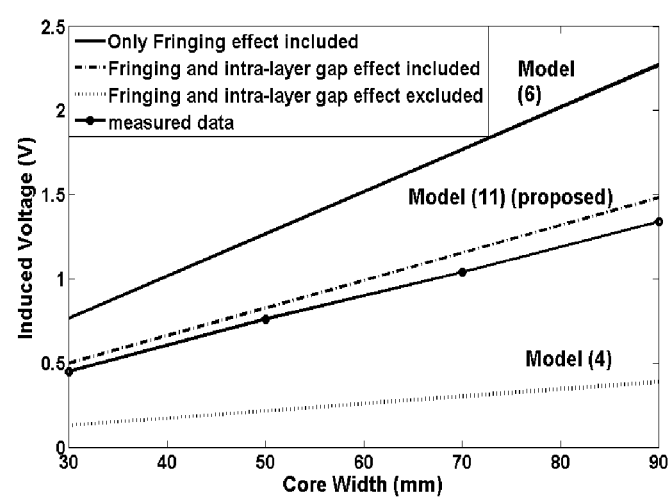
FIG. 9 illustrates theoretical and measured voltages vs. the width of core layers (w). Parameters: n=5, $l_g$=1 mm, d=0.1016 mm, N=280, I=13.5 A, f=60 Hz, T=0.78 mm, $N_p$=5, $\mu_r$=$10^5$.
Figure 10:
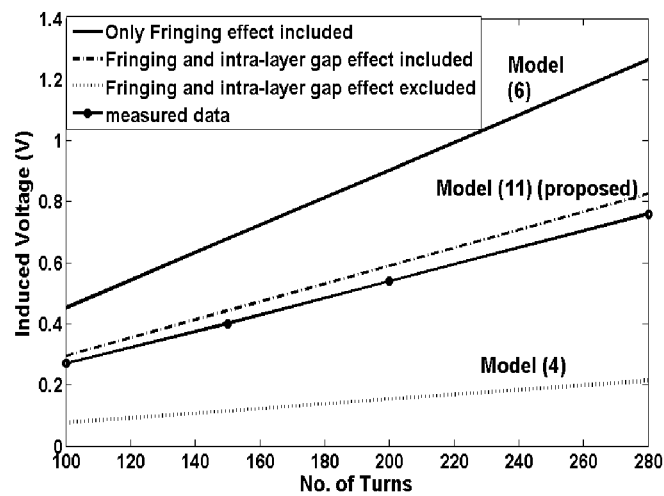
FIG. 10 illustrates theoretical and measured voltages vs. the number of turns (N). Parameters: n=5, $l_g$=1 mm, d=0.1016 mm, w=50 mm, I=13.5 A, f=60 Hz, T=0.78 mm, $N_p$=5, $\mu_r$=$10^5$.

Another factor that can be changed to vary the output ac voltage is the width (w) of the core layer. Measurements were also made by varying w from 30 mm to 90 mm with 20 mm steps. FIG. 9 shows the corresponding measured voltages, which are 0.449V, 0.76V, 1.039V and 1.34V, respectively. The calculated data using Model (11) are 0.4987V, 0.8266V, 1.1545V and 1.4824V, respectively. It is expected that the output voltage should increase with the increase in N. To verify this N was varied and measured the output voltage variation which is given in FIG. 10. Measurements were done for N=100, 150, 200 and 280. Corresponding measured output voltages were 0.27V, 0.4V, 0.539V and 0.76V, respectively. The calculated data found from Model (11) were 0.2948V, 0.4422V, 0.5896V and 0.8255V, respectively. The variation of the output voltage is linear with w and N.

Figure 11:
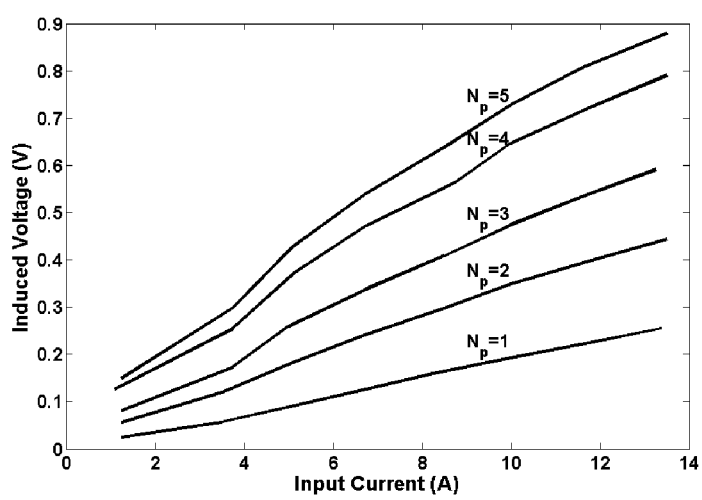
FIG. 11 illustrates measured induced voltages vs. currents (I) with number of turns ($N_p$) of the primary current conductor as a parameter. Parameters: w=50 mm, n=8, T=1.25 mm, N=280, $l_g$=1 mm, d=0.1016 mm, f=60 Hz, and $\mu_r$=$10^5$.

In a power system, power line conductors carry hundreds or even thousands of amperes of current and hence current carrying conductors have to be fat and low resistance to allow that. It is rather difficult to attain such high currents in a laboratory setting. To test the efficacy of the energy coupler in terms of its ability to have an induced voltage a multi-turn looping scheme was developed which was passed through the coupler coil. Essentially the more the number of turns in the looping scheme the higher was the magnetic field. Thus the magnetic field generated by $N_p$ turns of the current carrying conductor containing I amperes of current is equivalent to the magnetic field generated by $N_pI$ amperes of current. A prototype energy coupler was fabricated and measured the effects of $N_p$ and I on its induced voltage. The parameters of the energy coupler were as follows: w=50 mm, n=8, T=1.25 mm, N=280, $l_g=1$ mm, d=0.1016 mm, f=60 Hz, and $\mu_r=10^5$. Other parameters are listed in Table 4. FIG. 11 shows the effects of $N_p$ and I on the no load output ac voltage of the energy coupler. The output voltage increases as either $N_p$ or I increases. The increase in the induced voltage is linear when there is only one turn passing through the aperture of the energy coupler. For 2 to 5 turns there are some non-linearities visible especially for small I. This may be due to measurement error caused by slight movement of the coil with respect to the primary current carrying conductor.

B. DC Output Performance

Figure 12:
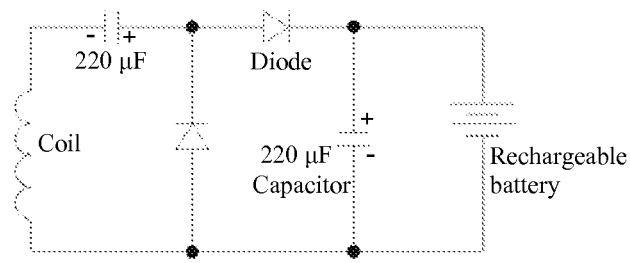
FIG. 12 illustrates a circuit diagram of the coil and the voltage multiplier with a rechargeable battery.

The dc output performance of the energy coupler is discussed herein. The experimental setup here is similar to the one shown in FIG. 6 except that the digital multimeter was disconnected from the coil terminals and was replaced with a voltage multiplier circuit. The number of primary conductor turns ($N_p$) passing through the aperture was 5. The parameters of the energy coupler were as follows: w=50 mm, n=8, T=1.25 mm, $l_g$=1 mm, N=280, d=0.1016 mm, I=13.5 A, f=60 Hz, $N_p$=5, and $\mu_r$=$10^5$. FIG. 12 shows the circuit diagram of the voltage multiplier connected across the coil terminals. The output of the voltage multiplier was connected to a 1.2V rechargeable NIMH coin cell battery. Like a rectifier, the voltage multiplier converts the induced ac voltage into dc voltage but unlike a rectifier it also increases the output dc voltage. The diode voltage drop is an important factor at low input voltage levels. Regular silicon and germanium diodes have forward voltage drops of 0.7V and 0.3V, respectively. The output ac voltage at the coil terminals is typically 0.88V (rms). If regular diodes are used the output dc voltage will be too low. Therefore, very low forward voltage drop diodes are needed. Two very low forward voltage drop (typically 0.1V at 10 mA) surface mount chip diodes (model#PMEG1020EA) and two 220 µF surface mount chip tantalum capacitors (model#572D227X06R3B2T) were utilized to construct the voltage multiplier circuit. The multiplier was fabricated by soldering the diodes and the capacitors on a 4 mil thick flexible polyimide substrate. The multiplier gives an output dc voltage which is a multiple of the input peak voltage minus the diode drops. The measured dc output of the multiplier was 2.4V which was about twice the input peak voltage and hence is sufficient to charge the miniature 1.2V rechargeable battery. The Varta (model#V250h) 1.2V battery has a capacity of 250 mAh.

Figure 13:
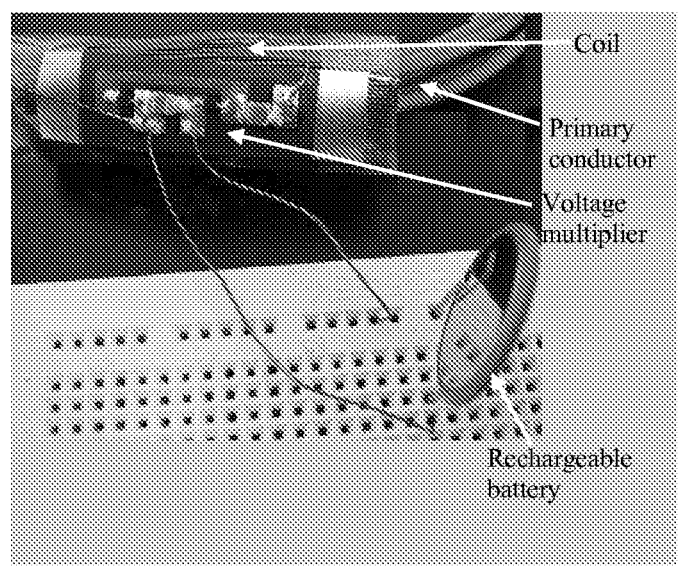
FIG. 13 illustrates an energy coupler charging a battery.
Figure 14:
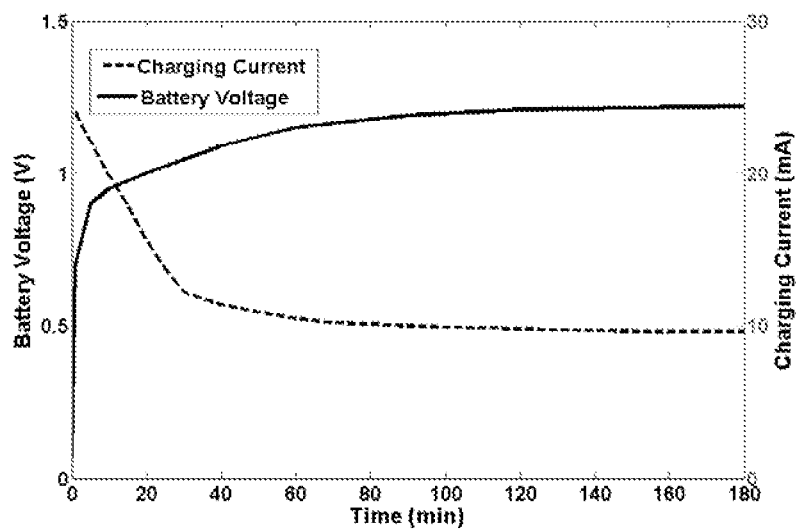
FIG. 14 illustrates a battery charging profile—battery voltage and charging current vs. charging time.

The battery charging capability of the energy coupler was experimentally evaluated. The rechargeable battery was first fully discharged and then connected across the voltage multiplier output as shown in FIG. 13. FIG. 14 shows the battery charging profile as a function of time. The battery voltage increases rapidly in the first 60 minutes and it reaches 1.2V slowly in approximately 3 hours (180 minutes). The charging current is as high as 24.2 mA at the instant when the battery is just connected to the voltage multiplier but it decreases as the battery voltages develops. The charging current settles around 10 mA when battery voltage reaches 1.2V. The manufacturer recommends charging the battery for 14-16 hours at a constant charging current of 24 mA for the full capacity of 250 mAh. However, the charging profile in FIG. 14 represents a constant voltage charging method (because the energy coupler provides a constant voltage) rather than constant current charging method as specified by the manufacturer. In constant voltage charging, the charging current is determined by the voltage difference between the charger (energy coupler plus multiplier here) and the battery. During the initial period the current starts at a relatively high value then decays quickly whereas the voltage increases rapidly as charging proceeds. In the constant voltage charging method the battery quickly attains partial charge.

To obtain full charge in this method somewhat longer charging time will be needed compared to other charging methods. Thus according to FIG. 14 approximately 24 hours will be needed to charge the battery to its full capacity. However, in most sensor devices, batteries are rarely charged from its fully discharged state. Instead batteries are pre-charged during installation and trickle charged during operation. From the manufacturer's datasheet, the trickle charging current recommended for the battery is 7.2 mA. From FIG. 14, it is evident that the energy coupler can meet the trickle charge current requirement of the battery.

Figure 15:
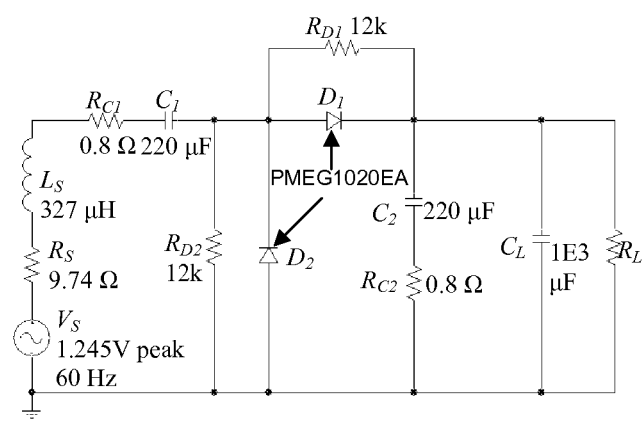
FIG. 15 illustrates a PSpice model for the coil and the voltage multiplier with a resistive load.

Next simulations and measurements were performed to determine how much power can be delivered to resistive loads instead of a battery across the voltage multiplier. For simulations, PSpice optimization tool was used to determine the optimum load resistance and optimum output dc power. FIG. 15 shows the PSpice model used for the optimization. Note that unlike FIG. 12, in this figure the coil is replaced by a voltage source ($V_S$), a source resistance ($R_S$) and a source inductance ($L_S$). The source resistance (in ohm) can be found as, $$R_S = \frac{l_{wire}}{\sigma A_{wire}} \quad (12)$$

where $l_{wire}$, $A_{wire}$ and $\sigma$ are the total length, cross sectional area and conductivity of the coil wire respectively. The source inductance (in nH) is found as, $$L_S = \frac{0.4\pi N^2 \mu_{rgn} A}{l_m} \times 10^{-2} \quad (13)$$

where N is the number of turns, $\mu_{rg}$, is the effective core permeability, A is the core cross sectional area in $cm^2$ and $l_m$ is the effective length of the core in cm. The series resistances $R_{C1}$ and $R_{C2}$ in FIG. 15 approximate the Equivalent Series Resistances (ESRs) of the capacitors $C_1$ and $C_2$ (respectively) at the power line frequency of 60 Hz. The parallel resistances $R_{D1}$ and $R_{D2}$ improve the modeling of the diodes in the reverse mode of operation. The capacitance $C_L$ was used only in simulations to approximate the dc mode of the multimeter. $C_L$ bypassed any AC ripple present at the simulation output. The PSpice simulation results are summarized in Table 2. Five different cases including an ideal case have been shown here. The wire diameter was varied and calculated $R_S$ and $L_S$ using (12) and (13). The PSpice optimization tool was used to determine the optimum load resistance that resulted in maximum power for each case. It can be seen that ideally it is possible to get 17.86 mW of output power. In practice, the output power decreases with a decrease in the wire diameter. For a 30 gauge wire which was used in the measurement, the optimum power was 10.38 mW which could be increased to 14.36 mW if a 27 gauge wire was used. However, increasing the wire diameter increases the coil height, which reflects the need for compromise between coil size and output power.

Figure 16:
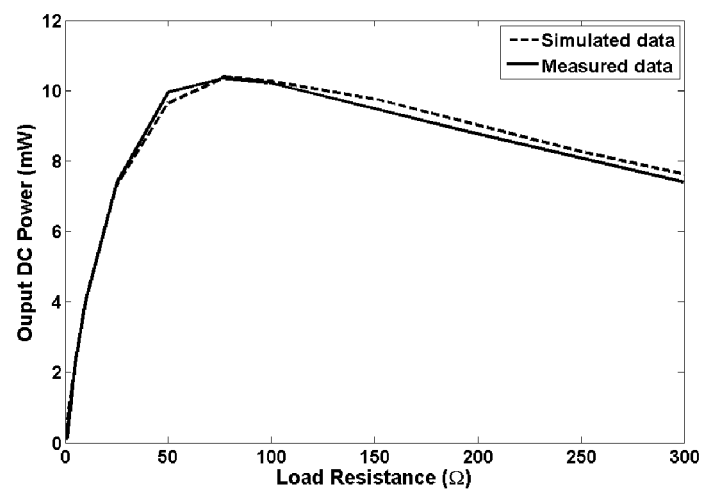
FIG. 16 illustrates simulated and measured dc output power of the voltage multiplier as function of load resistance.

Measurements were also made to determine the dc output performance of the multiplier circuit connected to resistive loads. A Tektronix DMM916 multimeter was used as an ammeter in series with the load to measure the load current. To ensure that the impedance of the DMM916 ammeter and the wire junctions do not affect the output voltage at the low load resistance level (e.g. $R_L \le 1\Omega$) the ammeter was removed and then connected a Tektronix CDM250 multimeter as a voltmeter across the load. A 30 gauge coil wire was used. Table 3 gives the PSpice simulation and measurement results for different load resistances. The output dc voltage that was observed is very low for small load resistance values. This is because of the loading effect. FIG. 16 shows the comparison between the simulated and the measured dc output power. The output dc power increases with increase in the load resistance for up to $R_L=76\Omega$ after which the output power decreases. Simulated maximum dc power is 10.385 mW with $R_L=76.09\Omega$ whereas measured maximum dc power is 10.358 mW obtained with $R_L=76.1\Omega$. The dc power is about 10 mW when $R_L$ is in the range of 50 to $100\Omega$. So these results imply that the designed prototype is capable of delivering the maximum dc power to devices with input impedances in the range of 50 to $100\Omega$. The dc output power could also be improved by optimizing the multiplier circuit design. Multiplier optimization techniques are already available and hence not addressed here.

In conclusion, a novel energy coupler is presented which can harvest energy from a power line. The energy coupler was fabricated by winding numerous turns of very thin conducting wires around a core made by shaping a few layers of flexible magnetic materials (mu-metals). Tens or hundreds of turns may be required depending on the available power line current and the required power for the wireless sensor. Since the laminated core material is flexible, the intentional core gap allows the coil to be wrapped around any cylindrical or square shaped geometry like a power line cable or insulated bus bar. The target use of the energy coupler is to charge the battery of a wireless sensor which will monitor line conditions such as short circuit, open circuit, insulation damage, sag etc. and then will transmit such data to a nearby supervisory station. Unlike other ultra-low power (in μW) energy harvesters that have been proposed, the energy coupler of the present disclosure can harvest tens of milliwatts of power from power transmission lines. The induced voltage can be optimized by varying the number of coil turns, coil wire diameter, core width and the number of layers of the core magnetic material. Conversely a single energy coupler can be designed and developed which will be able to function near power lines carrying currents from 70 A to approximately 1000 A.

The model proposed for the energy coupler gives a close approximation of the measured results. The theoretical values were calculated by measuring T and $l_m$. Since in the laboratory environment, it was not possible to maintain the uniformity of T and $l_m$, measurements were taken and averages were calculated and used. This could be a source of the discrepancy between the theoretical and measured voltages. Nevertheless the error margin is 10% which is not significant at the low output voltage level of the energy coupler.

The energy coupler of the present disclosure is small, flexible, and robust and hence can be easily placed on a power line. The coil wire, the mu-metal foils, the polyimide substrate, and the diodes used are low cost. Besides power system application, the proposed coupler has good potentials for application in miniature wireless devices where power need to be harvested from a nearby current carrying conductor without any physical connection to it.

In the interest of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so as further described in such appended claims.

What is claimed:

1. An energy harvesting system comprising:
a coil wound about a generally cylindrical shaped magnetic core having a first end and a second end, the coil comprising wires that are wound in such a manner that the wires are generally parallel to the cylindrical shaped magnetic core axis, the cylindrical shaped magnetic core defining a core gap that extends parallel to the magnetic core axis, the cylindrical shaped magnetic core defining an opening extending therethrough from the first end to the second end such that the cylindrical shaped magnetic core is configured to fit around current carrying conductor.

2. The system of claim 1, wherein the magnetic core comprises a mu-metal.

3. The system of claim 2, wherein mu-metal comprises a high permeability mu-metal.

4. The system of claim 1, further comprising an integrated voltage multiplier.

5. The system of claim 1, further comprising coil terminals.

6. The system of claim 1, wherein the wires have a diameter of less than about 0.5 mm.

7. The system of claim 1, wherein the magnetic core comprises foils of mu-metal.

8. The system of claim 7, wherein the foils have a thickness of less than about 5 mils.

9. The system of claim 8, wherein the foils are laminated together to form a multi-layer magnetic core.

10. The system of claim 9, wherein the multi-layer magnetic core includes air gaps between the layers.

11. The system of claim 1, further comprising a battery joined to the coil terminals.

12. An energy harvesting system comprising:
a coil wound about a generally cylindrical shaped magnetic core having a first end and a second end and an integrated voltage multiplier, the coil comprising wires that are wound in such a manner that the wires are generally parallel to the cylindrical shaped magnetic core axis, the cylindrical shaped magnetic core comprising a high permeability mu-metal defining a core gap that extends parallel to the magnetic core axis, the cylindrical shaped magnetic core defining an opening extending therethrough from the first end to the second end such that the cylindrical shaped magnetic core is configured to fit around current carrying conductor.

13. The system of claim 12, wherein the wires have a diameter of less than about 0.5 mm.

14. The system of claim 12, wherein the magnetic core comprises foils of mu-metal.

15. The system of claim 14, wherein the foils have a thickness of less than about 5 mils.

16. The system of claim 12, wherein the foils are laminated together to form a multi-layer magnetic core.

17. The system of claim 16, wherein the multi-layer magnetic core includes air gaps between the layers.

18. A method for scavenging energy comprising:
placing an energy scavenging device around a current carrying conductor, the energy scavenging device comprising a coil wound about a generally cylindrical shaped magnetic core having a first end and a second end, the coil comprising wires that are wound in such a manner that the wires are generally parallel to the cylindrical shaped magnetic core axis, the cylindrical shaped magnetic core defining a core gap that extends parallel to the magnetic core axis, the cylindrical shaped magnetic core defining an opening extending therethrough from the first end to the second end such that the cylindrical shaped magnetic core is configured to fit around the current carrying conductor;
charging a battery joined to the energy scavenging device.

19. A method as in claim 18, wherein the energy scavenging device further comprises coil terminals joined to a voltage multiplier, the coil terminals outputting ac voltage scavenged from the current carry conductor, the ac voltage being converted to dc voltage by the energy multiplier.

20. A method as in claim 18, wherein the energy scavenging device magnetic core comprises multi-layers comprising foils of mu-metal.

21. A method as in claim 20, wherein the multi-layer magnetic core includes air gaps between the layers.

* * * * *

UNITED STATES PATENT AND TRADEMARK OFFICE
CERTIFICATE OF CORRECTION

| | |
|---|---|
| PATENT NO. | : 8,564,298 B2 |
| APPLICATION NO. | : 12/631175 |
| DATED | : October 22, 2013 |
| INVENTOR(S) | : Ali et al. |

It is certified that error appears in the above-identified patent and that said Letters Patent is hereby corrected as shown below:

Title Page, item (75) Inventors: please delete "Bhulyan" and insert --Bhuiyan--

Signed and Sealed this
Twenty-ninth Day of July, 2014

Michelle K. Lee
*Deputy Director of the United States Patent and Trademark Office*